United States Patent
Suzuki et al.

(10) Patent No.: US 8,235,596 B2
(45) Date of Patent: *Aug. 7, 2012

(54) SLIDING BEARING

(75) Inventors: Mikio Suzuki, Inuyama (JP); Hideo Nakamura, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 650 days.

This patent is subject to a terminal disclaimer.

(21) Appl. No.: 12/407,968

(22) Filed: Mar. 20, 2009

(65) Prior Publication Data
US 2009/0238507 A1   Sep. 24, 2009

(30) Foreign Application Priority Data
Mar. 21, 2008   (JP) .................................. 2008-072995

(51) Int. Cl.
*F16C 9/02* (2006.01)
(52) U.S. Cl. ....................................................... 384/294
(58) Field of Classification Search .......... 384/275–279, 384/294
See application file for complete search history.

(56) References Cited

U.S. PATENT DOCUMENTS

| | | | |
|---|---|---|---|
| 4,206,268 A | 6/1980 | Roemer et al. | |
| 5,803,614 A * | 9/1998 | Tsuji et al. | 384/276 |
| 6,178,639 B1 | 1/2001 | Lytwynec et al. | |
| 6,309,759 B1 | 10/2001 | Tomikawa et al. | |
| 6,357,918 B1 * | 3/2002 | Kagohara et al. | 384/276 |
| 6,575,635 B1 * | 6/2003 | Tsuji et al. | 384/276 |
| 6,688,769 B2 * | 2/2004 | Takayanagi et al. | 384/276 |
| 6,863,441 B2 * | 3/2005 | Kawachi et al. | 384/276 |
| 2009/0238504 A1 * | 9/2009 | Suzuki et al. | 384/29 |

FOREIGN PATENT DOCUMENTS

| | | |
|---|---|---|
| GB | 2263950 A | 8/1993 |
| GB | 2438977 A | 12/2007 |
| JP | 06-074238 | 3/1994 |
| JP | 11050296 A | 2/1999 |
| JP | 2002-513890 | 5/2002 |
| WO | 99/57448 | 11/1999 |

* cited by examiner

*Primary Examiner* — James Pilkington
(74) *Attorney, Agent, or Firm* — Browdy and Neimark, PLLC

(57) ABSTRACT

A halved sliding bearing is provided, two of which are paired into a cylindrical shape. The halved sliding bearing includes a steel back metal, and a bearing alloy layer, which serves as a sliding surface, on the inside of the steel back metal. A coat layer of Bi or a Bi-based alloy is formed on the outside back surface of the steel back metal. Preferably, the coat layer consists of 1 to 30 mass % of one or more of Sn, Pb, In, Ag and Cu and the balance being Bi and inevitable impurities.

4 Claims, 2 Drawing Sheets

SLIDING BEARING

TECHNICAL FIELD

The present invention relates to a halved sliding bearing, two of which are paired into a cylindrical shape and which has a bearing alloy layer, serving as a sliding surface, on the inside of a steel back metal.

BACKGROUND OF THE INVENTION

Conventionally, for a halved sliding bearing, two of which are paired into a cylindrical shape and which has a bearing alloy layer, serving as a sliding surface, on the inside of a steel back metal, a flash plating layer (also referred to as "coat layer") has been deposited so as to coat the outer back surface of the steel back metal opposing to the inner peripheral surface on which the bearing alloy layer is formed and side edges thereof or the whole surface of steel back metal, as described e.g. in JP-A-6-74238 (see claim 6, paragraph [0006]) and JP-A-2002-513890 (see paragraph [0016]). The flash plating layer is deposited to prevent the steel back metal from corrosion and to give the steel back metal a bright and attractive appearance. As the flash plating layer, a plating layer of Sn, Pb or an alloy thereof having a thickness of 0.1 to 10 µm is used.

The above-described halved sliding bearing 1' is fitted on the inner surface of a bearing housing, for example, comprising a connecting rod 2 connected to a crankshaft of an internal combustion engine and a connecting rod cap 3, as shown in FIG. 2. The bearing housing comprising a connecting rod 2 and of the connecting rod cap 3 is subjected to repeated stress of compression and tension by dynamic load during the internal combustion engine operation. In particular, rigidity of the connecting rod has been lowered since the weight of internal combustion engine is reduced in recent years. In the case where the elastic deformation of the bearing housing increases with the decrease in rigidity, a relative slide occurs between the back surface of the halved sliding bearing 1' and the inner surface of the bearing housing. Furthermore, heat is generated on the inner surface of the halved sliding bearing 1' due to friction caused by sliding with a shaft. If the conventional coat layer of Sn, Pb or an alloy thereof melts accordingly, the coat layer flows under a bearing back surface pressure (radial stress) caused by an interference for fixing the halved sliding bearing 1' to the bearing housing or stress caused by sliding, and it aggregates locally at a low-pressure portion as deformedly shown in FIGS. 3A and 3B. Since the volume of Sn, Pb or the alloy thereof increases when melt, so that the flow amount thereof increases. Therefore, the volume of an aggregating part increases locally, which swells the sliding surface of the halved sliding bearing 1' to the inner surface side. Therefore, there arises a problem that the halved sliding bearing is liable to come into strong contact with the shaft.

SUMMARY OF THE INVENTION

The present invention has been made to solve the above problems, and accordingly an objective thereof is to provide a sliding bearing in which a coat layer formed on the outside back surface of a steel back metal of the halved sliding bearing forms minimized aggregation locally during an internal combustion engine is operated, and therefore a strong contact with a shaft is less liable to occur.

To achieve the above objective, the present invention provides a halved sliding bearing, two of which are paired into a cylindrical shape and which has a bearing alloy layer, serving as a sliding surface, on the inside of a steel back metal, wherein a coat layer of Bi or a Bi-based alloy is formed on the outside back surface of the steel back metal in contact with and pressed against the inner surface of the bearing housing.

According to the invention, although Bi or the Bi-based alloy flows due to a back surface pressure or a relative slide between the back surface of the halved sliding bearing and the inner surface of a bearing housing, the volume thereof decreases when melting, so that the flow amount is small. Since the volume of the aggregation is small, a strong contact caused by a direct contact with the shaft due to swelling of the sliding surface of the halved sliding bearing to the inner surface side is less liable to occur. While the thickness of the coat layer is preferably as small as possible in order to reduce the flow amount of the coat layer, the thickness is preferably in a range of 0.1 to 10 µm, further preferably in a range of 0.1 to 5 µm in order to prevent rust of the steel on the back surface of the halved sliding bearing from manufacture of the halved sliding bearing until incorporation in the halved bearing housing.

The coat layer of the Bi-based alloy preferably consists of 1 to 30 mass % of one or more of Sn, Pb, In, Ag and Cu, and the balance being Bi and inevitable impurities.

The effect for preventing rust is further improved when 1 to 30 mass % of one or more of Sn, Pb, In and Ag is contained in Bi for alloying, although a coat layer have the effect of preventing rust of steel on the back surface of the halved sliding bearing from manufactured until incorporated in the halved bearing housing. Furthermore, when the Bi-based alloy containing 1 to 30 mass % of one or more of Sn, Pb, In and Ag in Bi melted, the volume thereof decreases, and therefore the flow amount becomes small. Since the volume of the aggregating part is small, a strong contact, which is caused by swelling of the sliding surface of the halved sliding bearing to the inner side to directly contact with the shaft, is less liable to occur. If the content is lower than 1 mass %, further rust preventive effect cannot be obtained, and if the content exceeds 30 mass %, the property that the volume of the Bi-based alloy decreases when melting is diminished since the alloying components of Sn, Pb, In and Ag have the property that their volumes increase when melt. Especially, if the content of Sn, Pb, In and Ag exceeds 50 mass %, the property is nearly lost.

DETAILED DESCRIPTION OF THE INVENTION

Figure 2:
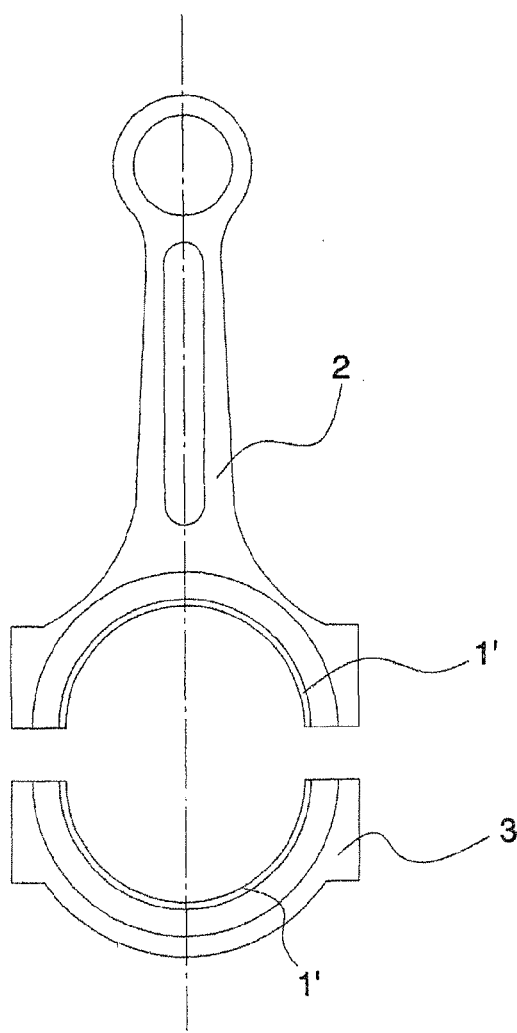
FIG. 2 is a front view showing the relationship between a halved sliding bearing and a connecting rod.

An embodiment of the present invention will be described below. A flat plate-shaped multilayer bearing material composed of a steel back metal 6 and a bearing alloy 7 is press-formed to manufacture a halved sliding bearing 1 so that the steel back metal 6 forms an outer peripheral surface like the above-mentioned halved sliding bearing 1' shown in FIG. 2. Thereafter, a coat layer 8 of Bi or a Bi-based alloy is formed on the back surface of the steel back metal 6 of the halved sliding bearing 1 by the electroplating process or the like. The method for forming the coat layer 8 of Bi or the Bi-based alloy on the back surface of the halved sliding bearing 1 is not limited to the electroplating process, and it can be formed by any other general coating methods such as a spraying method and a thermal spraying method. Alternatively, to improve bonding strength between the back surface of the steel back metal 6 and the coat layer 8 of Bi or the Bi-based alloy, the coat layer 8 may be formed after a general preliminary treatment such as degreasing or surface roughening, or the coat layer 8 may be formed after an intermediate layer of a metal such as Ag, Cu or an alloy thereof has been formed on the back surface of the steel back metal 6. The coat layer 8 may be formed only on the outer back surface of steel back metal 6 of the halved sliding bearing 1 excluding the inner sliding surface of the halved sliding bearing 1. However, in view of the productivity, the coat layer 8 may be formed also on the inner sliding surface at the same time.

To reduce the flow amount of the coat layer 8, the thickness of the coat layer 8 is preferably as small as possible. However, the thickness of the coat layer 8 is preferably in a range of 0.1 to 10 μm, further preferably 0.1 to 5 μm in order to prevent rust of the steel on the back surface of the halved sliding bearing 1 from manufacture of the halved sliding bearing 1 until incorporation in a halved bearing housing. The rust preventive effect is further improved by alloying Bi with 1 to 30 mass % of one or more of Sn, Pb, In and Ag.

Next, the results of a bearing test on the halved sliding bearing 1 manufactured as described above are explained with reference to Tables 1 and 2.

TABLE 1

| No. | Composition of coat layer | Thickness of aggregating part [μm] | Depth of partial wear of bearing sliding surface [μm] |
|---|---|---|---|
| Example 1 | Bi | 1 | 0 |
| Example 2 | Bi—2 mass % Sn | 1 | 0 |
| Comparative example 11 | Pb | 7 | 5 |
| Comparative example 12 | Sn | 10 | 7 |

TABLE 2

| Test condition | |
|---|---|
| Test time | 200 hours |
| Load | Full load |
| Number of revolutions | 6500 rpm |
| Operating condition | Continuous operation |

Figure 1:
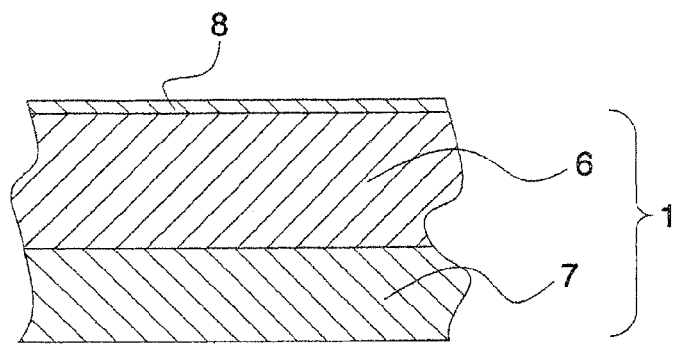
FIG. 1 is a schematic partial sectional view of a halved sliding bearing according to the present embodiment.

In examples 1 and 2 in Table 1, a multilayer material composed of the steel back metal 6 and the Al-based bearing alloy 7 was press-formed to manufacture the halved sliding bearing 1 having an outer diameter of 48 mm, an inner diameter of 45 mm, and a width of 21 mm so that the steel back metal 6 formed an outer peripheral surface. Next, the coat layer 8 having a composition of Bi or the Bi-based alloy (Bi-2 mass % Sn) given in Table 1 was formed on the back surface of the steel back metal 6 of the halved sliding bearing 1 by the electroplating process so that the thickness of the coat layer 8 was 3 μm. The cross-sectional structure of the halved sliding bearing 1 is shown in FIG. 1.

In comparative examples 11 and 12, the coat layer having a composition of Pb (comparative example 11) or Sn (comparative example 12) was formed on the back surface of the halved sliding bearing 1, which was manufactured under the same conditions as those in examples 1 and 2 by the electroplating process so that the thickness of the coat layer was 3 μm. In examples 1 and 2 and comparative examples 11 and 12, the outer diameter of the halved sliding bearing 1 was made slightly larger than the inner diameter of the bearing housing used for the bearing test by an interference for fixing the sliding bearing.

Figure 3A:
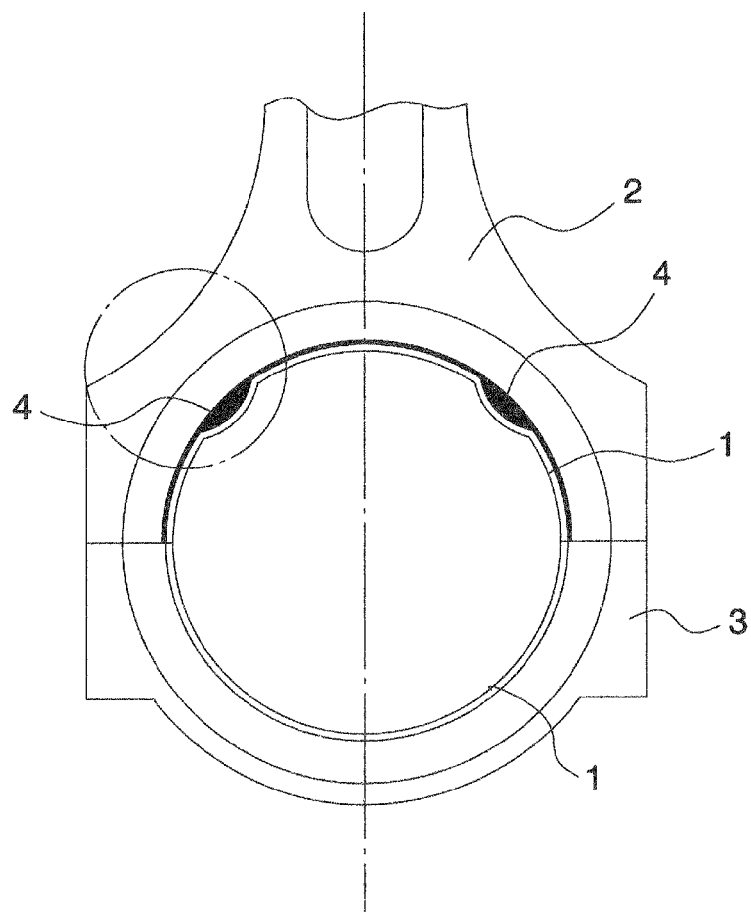
FIG. 3A is schematic front view deformedly showing an aggregating part formed between a back surface of a halved sliding bearing and an inner peripheral surface of a bearing housing.
Figure 3B:
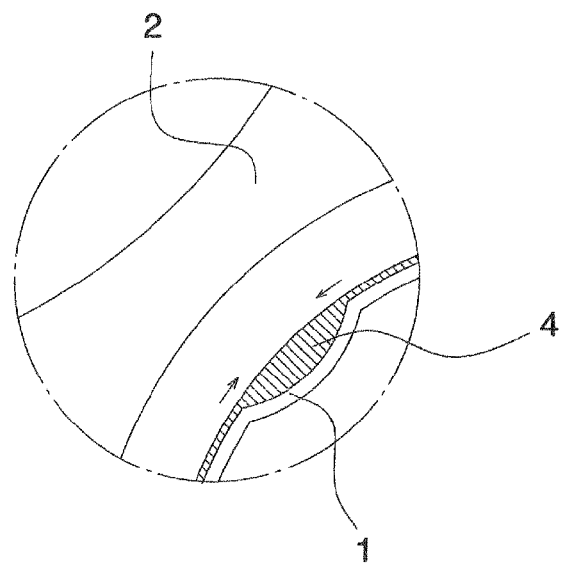
FIG. 3B is an enlarged view of a portion circled in FIG. 3A.

Two halved sliding bearings in each of examples 1 and 2 and comparative examples 11 and 12 configured as described above were paired, and inserted into a split-type connecting rod 2 and a connecting rod cap 3 of an internal combustion engine and then fastened by bolts. In this state, the connecting rod 2 and the connecting rod cap 3 were mounted in the internal combustion engine to conduct the bearing test. The bearing test was conducted under the test conditions given in Table 2 by using an inline four-cylinder engine having a displacement of 2000 cc as the internal combustion engine. Since the housing rigidity is thought to be lowest and the relative slippage is the largest in a transverse direction through a center of the bearing, when the direction is taken as 0° in the direction, aggregation is most likely to occur in the vicinity of 45° and 135° (refer to FIG. 3A). The thickness of an aggregating part 4 of Bi, the Bi alloy, Sn and Pb in those portions in examples 1 and 2 and comparative examples 11 and 12 and the depth of partial wear of bearing sliding surface caused by the aggregating part 4 were compared and evaluated. The evaluation results are given in Table 1. The aggregating part 4 was cut and the cross-section was photographed by a stereoscopic microscope to measure the thickness of the aggregating part 4 and the depth of partial wear. The thickness of the aggregating part 4 was determined as a numerical value obtained by subtracting the thickness of coat layer 8 before evaluation from the measured value.

In comparative examples 11 and 12, Sn or Pb melts and flows at a portion in which relative slippage between the inner diameter surface of the connecting rod 2 and the back surface of the halved sliding bearing 1 is increased in the bearing test, so that the local aggregating part 4 is formed on the back surface of the halved sliding bearing 1. Since the volume of Sn or Pb increases when melting, the flow amount increased, and therefore the local aggregating part 4 became as thick as 7 μm (comparative example 11) or 10 μm (comparative example 12). Furthermore, the aggregating part 4 deforms the sliding surface of the halved sliding bearing 1 as to swell to the bearing inner diameter side, so that a clearance between the sliding surface of the halved sliding bearing 1 and a shaft becomes narrowed, and therefore the sliding surface of the halved sliding bearing 1 comes into direct contact with the shaft. Therefore, the depth of partial wear of the inner surface of bearing became as large as 5 μm (comparative example 11) or 7 μm (comparative example 12).

On the other hand, in examples 1 and 2, Bi or the Bi-based alloy melts and flows at a portion in which relative slippage between the inner diameter surface of the connecting rod 2 and the back surface of the halved sliding bearing 1 is increased, so that the local aggregating part 4 was formed on the back surface of the halved sliding bearing 1. However, since the volume of Bi or the Bi-based alloy decreases when melting, the flow amount decreases, and therefore the aggregating part 4 having a thickness as small as about 1 μm was formed in both of examples 1 and 2. This small aggregating part 4 was relaxed by a gap between the inner surface of the halved sliding bearing 1 and the mating shaft, so that the sliding surface of the halved sliding bearing 1 does not come into direct contact with the mating shaft. Therefore, it was found that the depth of wear was 0 μm in both of examples 1 and 2, and partial wear did not occur. Among the Bi-based alloys with which the bearing test was conducted, only example 2 was given in Table 1. However, the present inventors verified that other Bi-based alloys comprising Bi and 1 to 30 mass % of one or more of Sn, Pb, In, Ag and Cu also had a property that the volumes thereof decreased when melting like Bi.

The present invention is not limited to the halved sliding bearing used for the connecting rod of an internal combustion engine shown in example, and can be applied to a halved sliding bearing used by being incorporated in a split-type bearing housing for any other applications.

The invention claimed is:

1. A halved sliding bearing, comprising
two halved sliding bearing parts paired into a cylindrical shape,
each of the sliding bearing parts comprising
a steel back metal,
a bearing alloy layer, serving as a sliding surface, on an inside surface of the steel back metal, and
a coat layer of Bi or a Bi-based alloy on an outer back surface of the steel back metal,
wherein the halved sliding bearing is adapted to be fixed within a bearing housing with the coat layer of Bi or Bi-based alloy in contact with and pressed against an inner surface of the bearing housing.

2. The halved sliding bearing according to claim 1, wherein the coat layer is made from the Bi based alloy consisting of
1 to 30 mass % of one or more of Sn, Pb, In, Ag and Cu, and the balance being Bi and inevitable impurities.

3. A halved sliding bearing assembly, comprising
two halved sliding bearing parts paired into a cylindrical shape,
each of the sliding bearing parts comprising
a steel back metal,
a bearing alloy layer, serving as a sliding surface, on an inside surface of the steel back metal, and
a coat layer of Bi or a Bi-based alloy on the outer back surface of an steel back metal,
wherein the halved sliding bearing is fixed within a bearing housing with the coat layer of Bi or Bi-based alloy in contact with an inner surface of the bearing housing.

4. The halved sliding bearing assembly according to claim 3, wherein the coat layer is made from the Bi based alloy consisting of
1 to 30 mass % of one or more of Sn, Pb, In, Ag and Cu, and the balance being Bi and inevitable impurities.

* * * * *